United States Patent
Neal

(10) Patent No.: US 10,517,376 B2
(45) Date of Patent: Dec. 31, 2019

(54) TOOL SUPPORT STRAP

(71) Applicant: Impax Marketing, LLC, Portland, OR (US)

(72) Inventor: Ryan Neal, Portland, OR (US)

( * ) Notice: Subject to any disclaimer, the term of this patent is extended or adjusted under 35 U.S.C. 154(b) by 0 days.

(21) Appl. No.: 15/957,972

(22) Filed: Apr. 20, 2018

(65) Prior Publication Data

US 2018/0303228 A1 Oct. 25, 2018

Related U.S. Application Data

(60) Provisional application No. 62/488,738, filed on Apr. 22, 2017.

(51) Int. Cl.
*A45F 3/14* (2006.01)
*A01D 34/416* (2006.01)

(52) U.S. Cl.
CPC .............. *A45F 3/14* (2013.01); *A01D 34/416* (2013.01); *A45F 2003/142* (2013.01)

(58) Field of Classification Search
CPC .... A45F 3/14; A45F 2003/142; A01D 34/416
USPC .................. 224/602–622, 257–258, 264
See application file for complete search history.

(56) References Cited

U.S. PATENT DOCUMENTS

| | | | |
|---|---|---|---|
| 5,143,266 A * | 9/1992 | Heckerman | A44B 11/006 224/150 |
| 5,695,102 A * | 12/1997 | Jackson | A45C 13/30 224/257 |
| 6,158,636 A | 12/2000 | Latiolais | |
| 6,371,346 B1 * | 4/2002 | Sharma | A45F 3/14 224/195 |
| 6,776,317 B1 * | 8/2004 | Parker | A45F 5/00 224/250 |
| 7,781,656 B2 * | 8/2010 | Furuta | G10G 5/005 224/257 |
| 8,534,515 B2 * | 9/2013 | Muchin | A01D 34/902 224/254 |
| 8,857,682 B2 | 10/2014 | Nakaya et al. | |
| 9,285,658 B2 * | 3/2016 | Xu | G03B 17/563 |
| 2007/0080182 A1 * | 4/2007 | Thatcher | A45F 3/14 224/148.4 |
| 2012/0061439 A1 * | 3/2012 | Wallis | A45F 5/00 224/600 |

\* cited by examiner

*Primary Examiner* — Scott T McNurlen
(74) *Attorney, Agent, or Firm* — McClure, Qualey & Rodack, LLP

(57) ABSTRACT

A tool support strap is disclosed that has an inner, elastic core throughout the entire central segment of the strap with an elastomeric covering over the inner core. Encircling the elastic core is a self-centering shoulder pad. Adjustable straps are provided to adjust for the girth and the arm length of the user, which may be done through a central buckle, clip, or the like.

5 Claims, 4 Drawing Sheets

TOOL SUPPORT STRAP

BACKGROUND

Handheld power tools, and primarily, handheld power tools used for landscaping purposes, are in wide use by both professional landscapers and homeowners. Such tools can include, but are not limited to, weed trimmers, blowers, hedge trimmers, and others. The category may also be expanded to include handheld stick vacuums used on carpeting and on hard surface flooring of various types. Most such tools include a pair of spaced handles, designed so that the user can balance the tool, with the weight distributed more or less evenly between the working end and the opposite end which has a motor or battery pack, and also to comfortably utilize the tool for its designated function.

Many attempts have been made to develop a shoulder strap system, designed to support the tool on the shoulder of the user. For example, U.S. Pat. No. 8,857,682, issued to Nakaya, et al., teaches a suspender for a brush cutter that has a shoulder belt and a support member removably connected to the shoulder belt. Linkage, including a hook to support the tool and a spring to allow some flexibility, are used to support the tool during use. U.S. Pat. No. 8,534,515, issued to Muchin, et al., teaches a pivoting elastic shoulder support which has a fixed shoulder support harness with an elastic strap attached to each end thereof, allowing the user to maneuver the tool during use. U.S. Pat. No. 6,158,636, issued to Latiolais, teaches a similar arrangement in which a fixed length shoulder strap is attached to bungee cords at each end, the bungee cords allowing the user to extend the tool by pressing down on the tool against the force of the bungee cords.

The above examples, and others in the prior art, suffer from certain drawbacks. Some prior art support straps are non-elastic and of a fixed length, and while others provide a non-elastic strap that has a length adjustment component. Others, like the patents to Muchin, et al. and Latiolais incorporate dual component straps, which have a non-elastic portion and an elastic portion connected thereto. One common feature; however, is that all known prior art straps have a non-elastic portion that encircles the neck and/or shoulder of the user. Thus, even when coupled with an elastic portion or portions, the amount of flexibility afforded the user is considerably limited. While providing utility, known prior art strap assemblies force the user to do a significant amount of walking in order to maneuver the tool, and limit the ability of the user to extend the tool away from the body to reach areas more remote from the user. It is to these disadvantages and others that the present disclosure is addressed.

SUMMARY

The present disclosure relates to a tool support strap that has an inner, elastic core throughout the entire central segment of the strap with an elastomeric covering over the inner core. Encircling the elastic core is a self-centering shoulder pad. Adjustable straps are provided to adjust for the girth and the arm length of the user, which may be done through a central buckle, clip, or the like. Hook and loop fasteners or other means are provided to secure the adjustments. A single point of attachment is provided via a cinch or the like to secure the present tool support strap to the implement to be used.

Various additional objects and advantages of the present tool support strap will become apparent from the following description, taking in accordance with the accompanying drawings.

DETAILED DESCRIPTION

Figure 1:
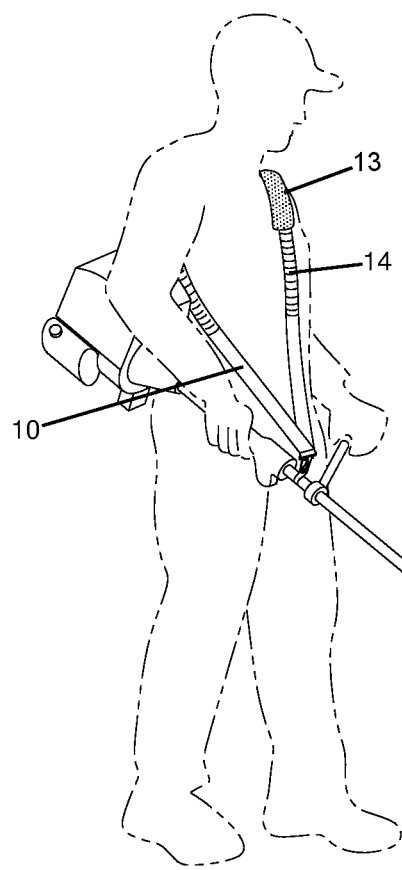
FIG. 1 is a perspective view of the present tool support strap shown attached to a string trimmer.
Figure 1:
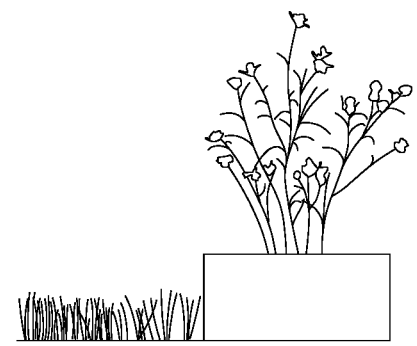

Referring now more specifically to the drawings and to FIG. 1 in particular, numeral 10 designates generally a tool support strap for use in supporting various handheld tools. There are two embodiments disclosed in the present application; however, both embodiments share a common feature. In both embodiments, the portion of the strap that encircles the user's body, the central segment 14, comprises an interior elastomer 16 surrounded by an expansion sleeve or sheath 18. Attached to both ends of the central segment is a user sizing adjustment portion, which comprises non-elastomeric webbing which is adjustable to accommodate the girth of the user and the user's arm length. The difference in the two embodiments comes in the user sizing adjustment portion of the straps, which comprise two different ways to adjust the length of the webbing and the means with which the webbing is attached to the tool itself.

As shown in FIG. 1, the tool support strap 10 is shown encircling the body of the user, (the user shown in phantom lines), and attached to a string trimmer 12. The string trimmer is shown as an example, and the present support strap may be used for a variety of handheld tools. The support strap 10 is designed to rest on one or the other shoulder of the user, utilizing a shoulder pad 13, and to encircle the torso. Attachment to the string trimmer 12 can be made at any convenient location on the trimmer.

Figure 2:
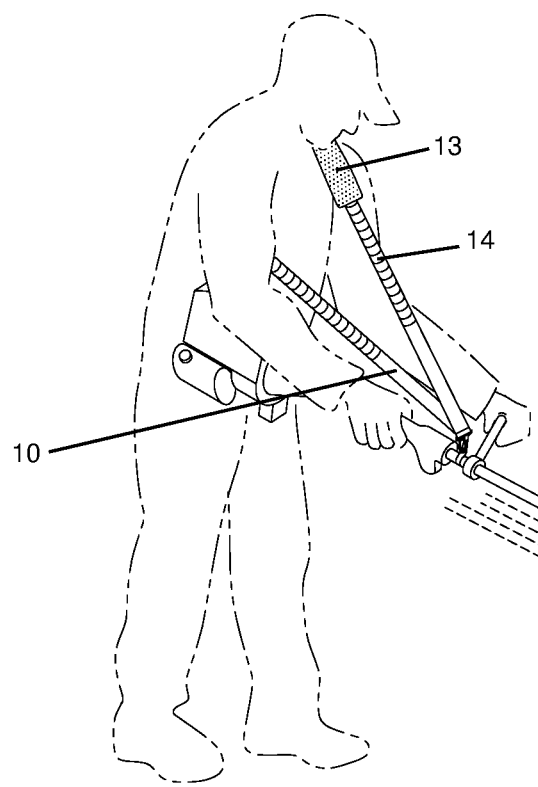
FIG. 2 is a perspective view of the tool support strap, shown in an extended position.
Figure 2:
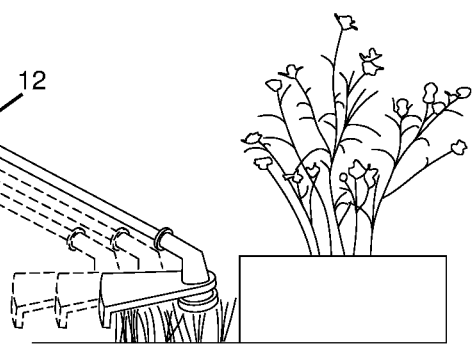

It will be noted that in FIG. 2, the user is standing in the same position as in FIG. 1, but has extended the trimmer by pushing against the tool support strap 10 to reach an area remote from the user, all without having to move closer to the area to be trimmed. This provides much greater utility than that found in prior art support straps as the elastomeric segment comprises more than 40% of the overall length of the strap. Not only is the user able to reach a greater area while standing in the same position, the trimmer can be extended, via the present tool support strap, to reach under or around obstacles that would otherwise be inaccessible.

Referring to FIGS. 3-6, example embodiments of the present tool support strap and its construction are shown. As noted, the tool support strap has an extensible segment 14, illustrated in detail in FIGS. 5 and 6. The extensible portion has a central elastic core 16 that extends throughout the length of the extensible segment. By providing a significantly longer elastic core, the tool support strap is capable of being extended to a much greater distance than prior art support straps that have much shorter elastic segments. The much greater surface area of the elastic core enables a more ideal ratio of length to stretch properties; in this case, on the order of 10-15 inches of extension from a relaxed state. Shorter elastic segments, such as those found in the prior art, are able to be extended only a few inches thereby providing a greatly reduced utility. Elastic core 16 is a single layer latex material, the circumference of which can be varied depending on the application. The elastic core can also be shaped differently, such as a flat strip, an ovular tube, a rectangular member, etc.

Surrounding the central core is an expansible and collapsible elastomeric outer sheath 18, the accordion type folds providing the ability to expand and contract. The outer sheath is a gathered tubular nylon fabric to provide a comfortable texture and also to protect the inner elastic core.

Figure 3:
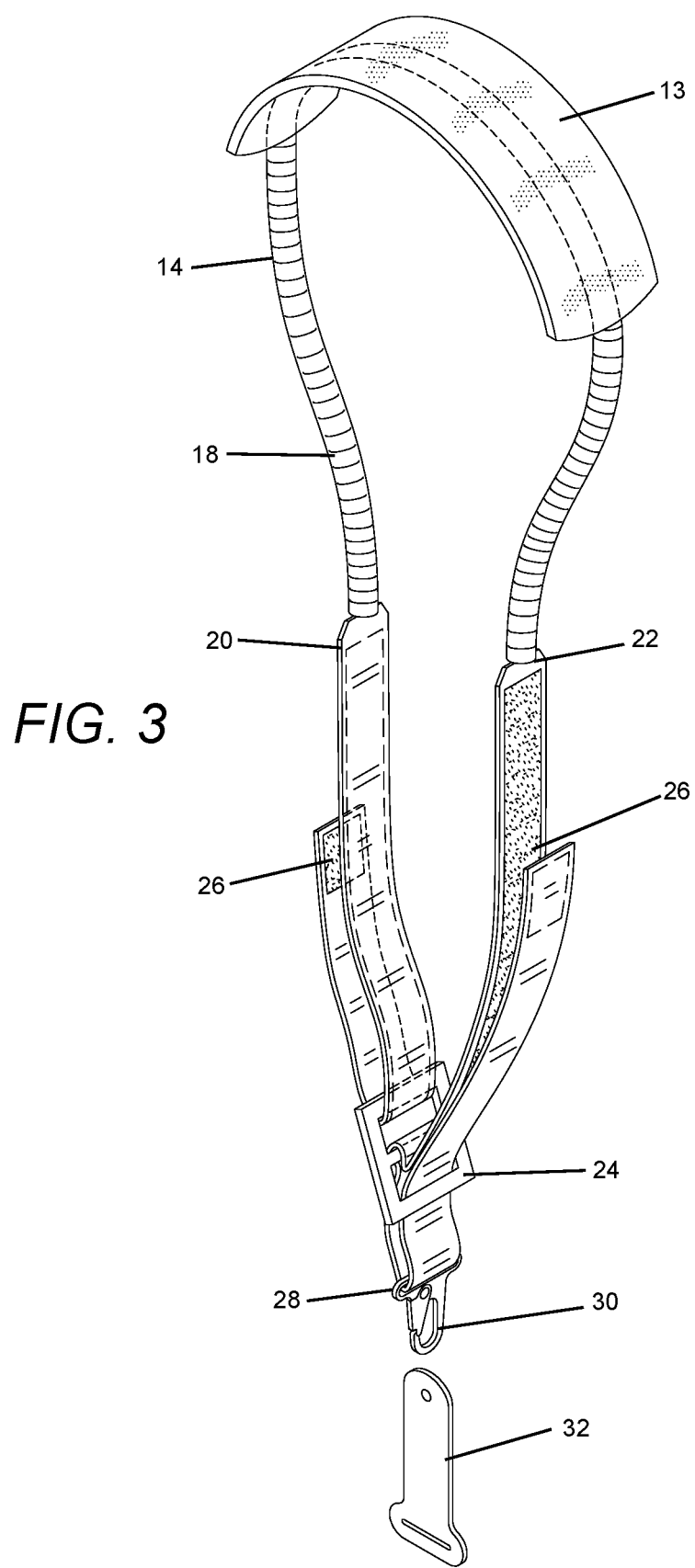
FIG. 3 is a perspective view of an embodiment of the present tool support strap.

Another unique advantage of the present tool support strap is shown by the embodiment of FIG. 3. The resilient segment of the strap is attached at each end to non-elastic webbing strips 20 and 22 that interlock through a ladder clip 24. This allows the strips to be doubled back upon themselves to be held with a hook and loop type fastener 26. Downstream from the hook and loop fastening system is a floating ring 28 that encircles one of the strips 22 and provides for easy attachment to the string trimmer or other tool. A spring clip 30 and a "dog bone" cinch 32 are illustrated as possible means of connecting the present tool support strap to the string trimmer or other tool. By providing the flexible segment of the present strap in the center of the strap as opposed to at either end, the present strap allows the user to easily size the strap to accommodate the user's girth and arm length, all while actually having the strap in place around the neck and shoulder of the user. Any adjustments are in front of the user, easily accessible, and can be quickly accomplished. Thus, as opposed to prior art straps, in which the user is attaching the flexible portion of the straps to the tool, the present devices provides a non-extensible attachment to the tool while providing an elastic component that is remote from the tool. This provides both better control of the tool and the ability for the user to extend the tool a much greater distance than is possible with straps known in the prior art.

Figure 4:
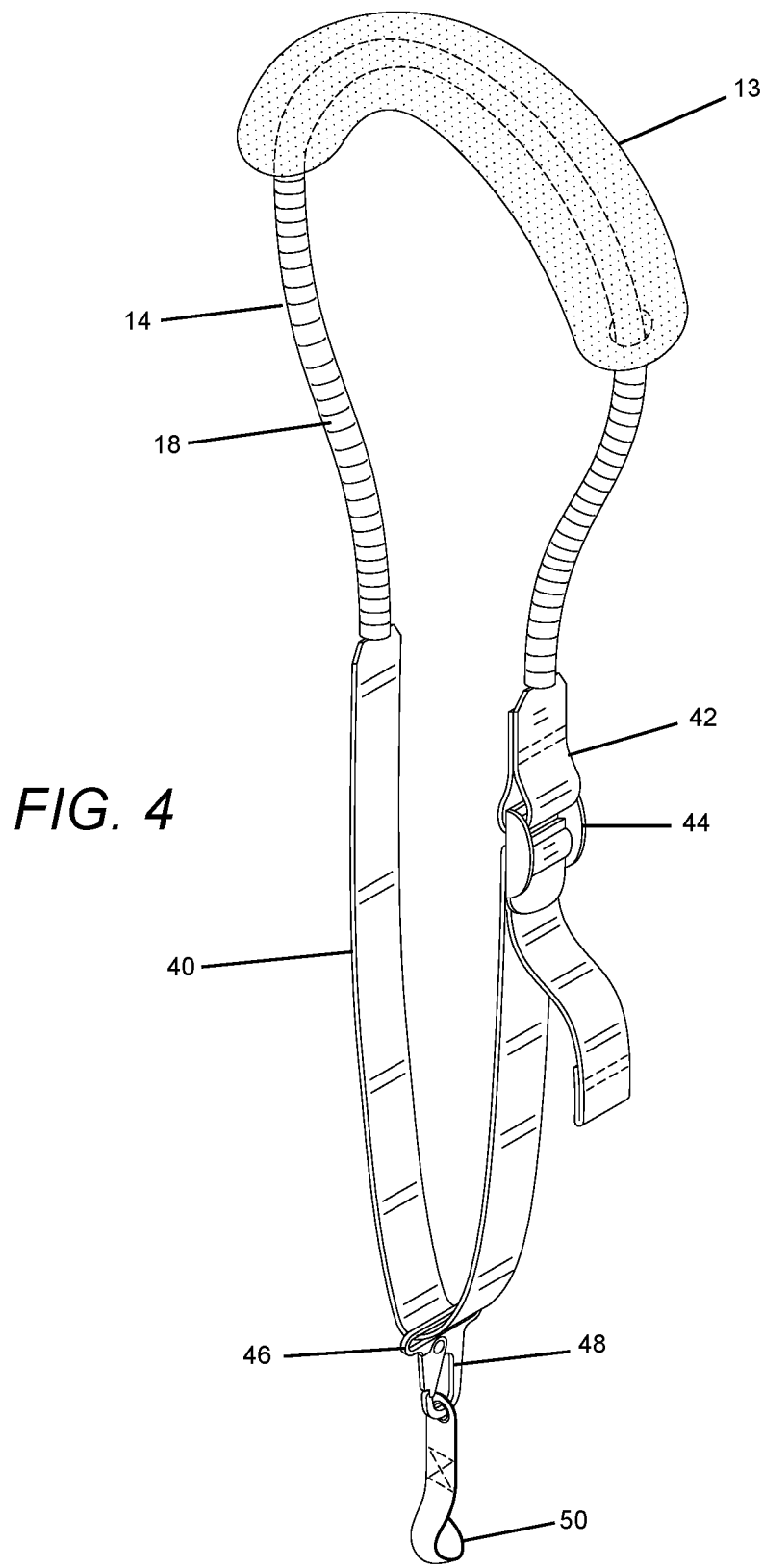
FIG. 4 is a perspective view of an alternate embodiment of the tool support strap.
Figure 5:
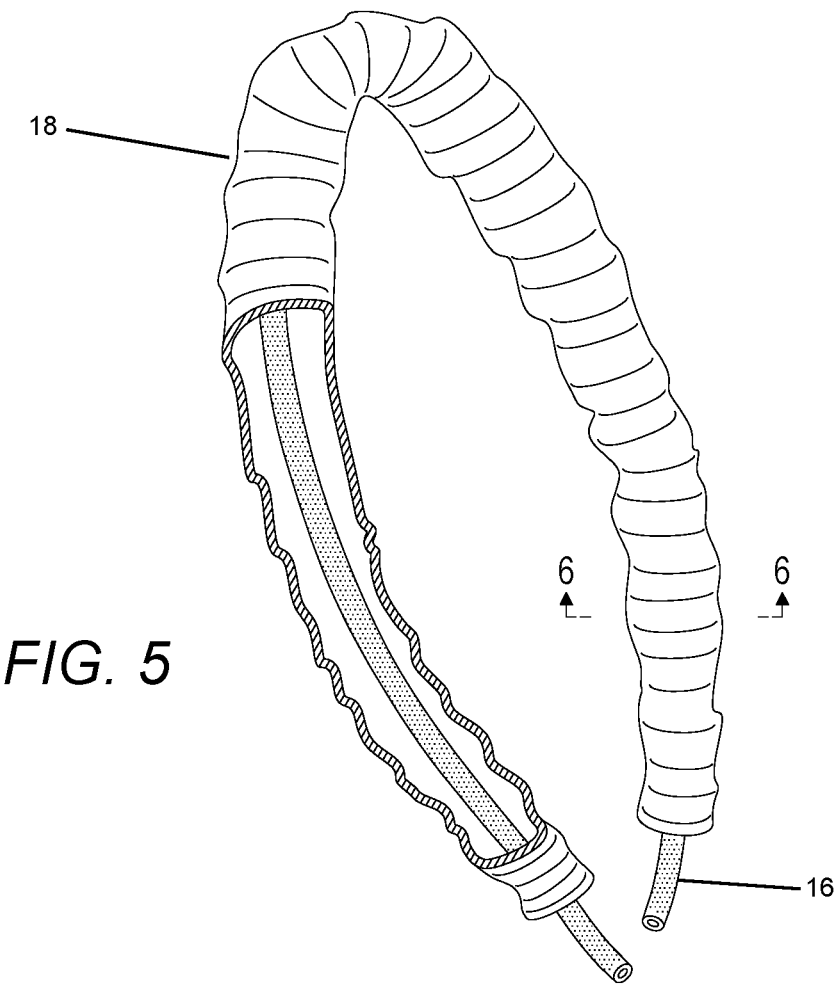
FIG. 5 is a partial perspective view, shown partially in cross section, illustrating the construction of the extensible central segment of the tool support strap.
Figure 6:
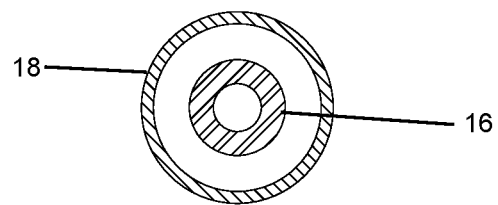
FIG. 6 is a cross sectional view, taken along line 6-6 of FIG. 5.

FIG. 4 illustrates another embodiment of the present tool support strap. In this embodiment, as before, the central segment 14 of the strap is the extensible portion. Connected at each end of the extensible portion are non-elastic webbing strips 40 and 42, or the like, that are formed into a loop by means of a ladder clip 44. This single point of adjustment allows the user to adjust the strip to accommodate the girth and arm length of the user. A floating ring 46 encircles the loop formed by the strips and a conventional spring clip 48 and cinch 50 are provided for attachment of the tool support strap to the tool to the user. Here again, the user is provided with a quick and easy adjustment of the webbing to accommodate a comfortable grip on the tool and a greatly enhanced ability to extend the tool to a location remote from the user, without the user having to adjust their position.

Thus, while an embodiment and modifications thereof have been shown and described herein, various additional changes and modifications may be made without departing from the scope of the present invention.

The invention claimed is:

1. A tool support strap for attachment to a hand tool supported by an operator, said strap comprising:
   a central segment having an elastomeric tube and a flexible sleeve covering the tube, the tube having a first end and a second end, the sleeve having accordion-type folds along a length thereof configured to permit lengthwise expansion and contraction of the sleeve about the tube;
   a non-elastic first webbing strip having a first end and second end, the first end of the first webbing strip being attached to the first end of the elastomeric tube;
   a non-elastic second webbing strip having a first end and a second end, the first end of the second webbing strip being attached to the second end of the elastomeric tube;
   a connector configured to secure the first webbing strip and the second webbing strip together and provide adjustment of a size of a first loop, configured to receive a portion of a torso of the operator of the hand tool, formed by the connector, the first webbing strip, central segment and the second webbing strip; and
   a cinch configured to connect the second webbing strip and the hand tool;
   wherein:
   the connector is further configured to provide a second loop formed by the second webbing strip; and
   the tool support strap further comprises a floating ring disposed around the second loop.

2. A tool support strap as defined in claim 1, wherein the cinch is secured to the floating ring.

3. A tool support strap as defined in claim 1, wherein the central segment comprises more than forty percent of a length of each of the first webbing strip and the second webbing strip.

4. A tool support strap as defined in claim 1, wherein the connector is a ladder clip.

5. A tool support strap as defined in claim 1, further comprising a shoulder pad attached to the sleeve.

* * * * *